US007424279B1

(12) United States Patent
Welk et al.

(10) Patent No.: US 7,424,279 B1
(45) Date of Patent: Sep. 9, 2008

(54) METHOD FOR ENHANCING IN REAL-TIME THE PLAYBACK OF AN AUDIO BROADCAST SIGNAL

(75) Inventors: Douglas L. Welk, Rossville, IN (US); Mathew A. Boytim, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1477 days.

(21) Appl. No.: 09/663,513

(22) Filed: Sep. 15, 2000

(51) Int. Cl.
*H04B 1/18* (2006.01)

(52) U.S. Cl. ................ 455/186.1; 455/3.06; 455/185.1; 455/344; 455/345; 455/418; 386/66; 386/68; 725/100

(58) Field of Classification Search ............. 455/186.1, 455/185.1, 45, 3.01–3.06, 418–420, 344–345; 359/69; 725/100, 28, 85, 87, 104, 133, 141, 725/153; 386/66–69, 96–116, 39–40
See application file for complete search history.

(56) References Cited

U.S. PATENT DOCUMENTS 5,241,428 A * 8/1993 Goldwasser et al. ........ 386/109
5,261,004 A 11/1993 Manlove et al.
5,428,829 A 6/1995 Osburn et al.
5,930,444 A * 7/1999 Camhi et al. .................. 386/46
5,937,337 A 8/1999 Marrah et al.
6,480,667 B1 * 11/2002 O'Connor .................... 386/83
2002/0013949 A1 * 1/2002 Hejna, Jr. .................... 725/100

* cited by examiner

*Primary Examiner*—Tuan A Tran
(74) *Attorney, Agent, or Firm*—Jimmy L. Funke

(57) ABSTRACT

A method is provided for enhancing in real-time the playback of a broadcast data signal. The method comprises the steps of: (a) receiving a broadcast data signal at a player device; (b) storing the broadcast data signal on the player device; (c) generating an output signal based on the broadcast data signal substantially simultaneous to the storage of the broadcast data signal; (d) creating a time delay between the storage of the broadcast data signal and the generation of the output signal; and (e) adjusting the time delay between the storage of the broadcast data signal and the generation of the output signal, thereby manipulating the output signal from the player device.

9 Claims, 3 Drawing Sheets

METHOD FOR ENHANCING IN REAL-TIME THE PLAYBACK OF AN AUDIO BROADCAST SIGNAL

TECHNICAL FIELD

The present invention relates generally to a method for enhancing a real-time radio broadcast and, more particularly, to a method for manipulating the playback of an audio broadcast signal by using a storage medium in an audio player device.

BACKGROUND OF THE INVENTION

TiVo Inc. has recently begun marketing a personal television service that allows users to enhance the viewing of a television broadcast. Rather than recording a television program on an analog tape using a conventional VCR, this service uses a video recording device that digitizes the incoming video and stores it on an internal storage device. In this way, the TiVo service allows a user to digitally record a variety of television programs and then control the viewing of these programs at their leisure. For instance, the TiVo service permits a user to pause the broadcast video for up to 30 minutes and then resume viewing at a later time. Since the service is intended for viewing within the home environment, it generally assumes that the user does not need to watch the television broadcasts within a limited time period. As a result, the TiVo service does attempt to retain a close correlation in time between the incoming video broadcast and the television programs being viewed by the user.

Likewise, it is desirable to provide a similar service for enhancing the playback of a radio broadcast. Although applicable in a variety of environments, a service for manipulating a radio broadcast in real-time would be very desirable in the context of a motor vehicle. Unlike in the home environment, the user typically is listening to a live radio broadcast during the short time intervals in which they are travelling in the vehicle.

Therefore, it is desirable to provide a method for enhancing the playback of a radio broadcast in real-time. For instance, it is envisioned that a user may want to replay a short segment of the radio broadcast. However, the user may also be accustomed to listening to a particular portion of the broadcast during the time they spend in the vehicle. In this case, it is desirable to playback the broadcast slightly faster than real-time in order to synchronize with the live broadcast. Alternatively, it is envisioned that a user may not want to listen to the commercials during a live radio broadcast. In this case, the playback of the broadcast is enhanced by skipping over the commercial segments of the radio broadcast. In any event, it is desirable to provide a method for manipulating the playback of a live radio broadcast, and yet retain a close correlation in time between the incoming broadcast signal and the audio output generated by the audio system.

SUMMARY OF THE INVENTION

In accordance with the present invention, a method is provided for enhancing in real-time the playback of a broadcast data signal. The method comprises the steps of: (a) receiving a broadcast data signal at a player device; (b) storing the broadcast data signal on the player device; (c) generating an output signal based on the broadcast data signal substantially simultaneous to the storage of the broadcast data signal; (d) creating a time delay between the storage of the broadcast data signal and the generation of the output signal; and (e) adjusting the time delay between the storage of the broadcast data signal and the generation of the output signal, thereby manipulating the output signal from the player device.

For a more complete understanding of the invention, its objects and advantages, refer to the following specification and to the accompanying drawings.

DESCRIPTION OF THE PREFERRED EMBODIMENT

Figure 1:
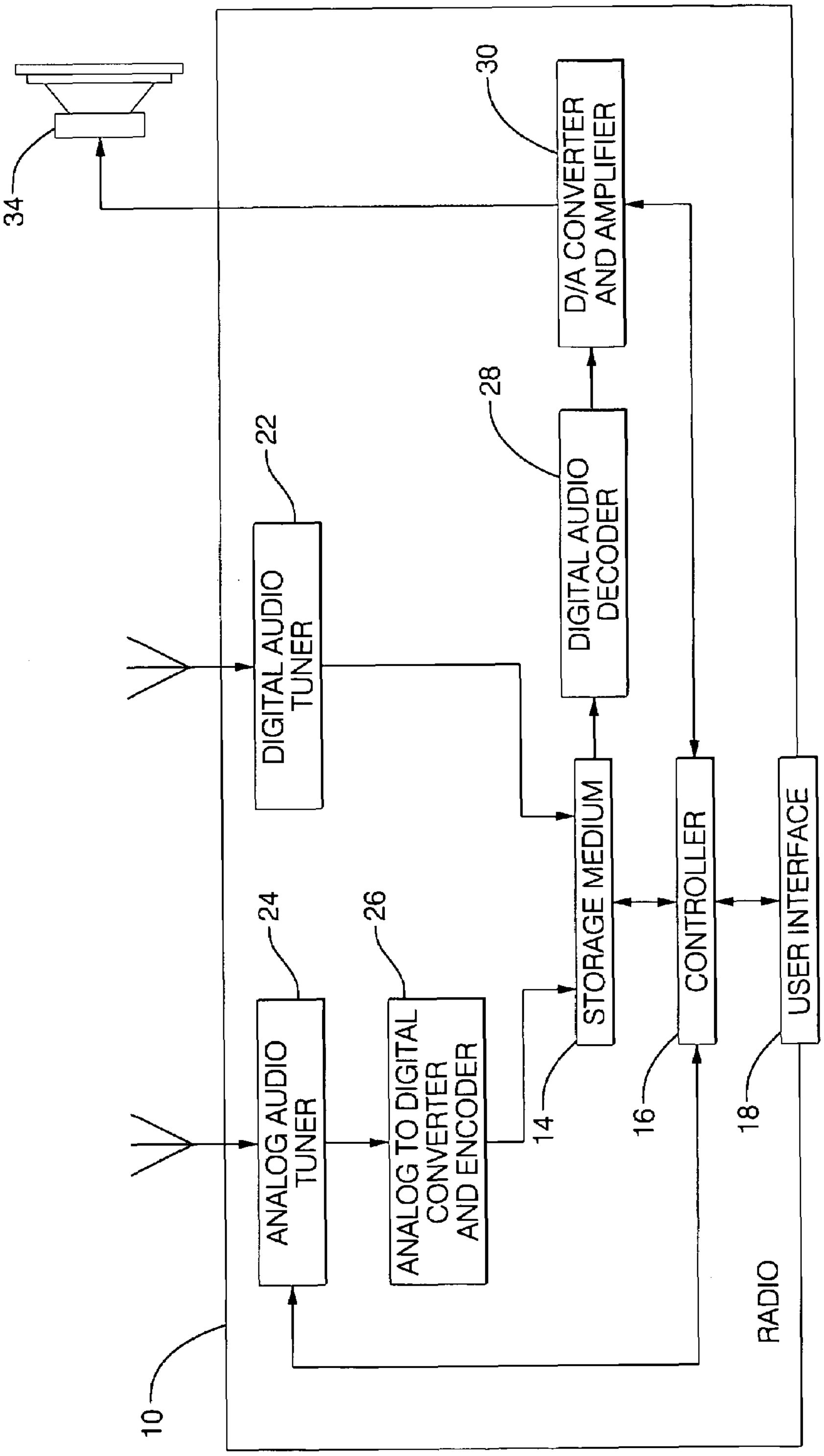
FIG. 1 is a block diagram of an audio player device embodying features of the present invention.

An audio recorder/player device 10 embodying features of the present invention is depicted in FIG. 1. The audio player device 10 may include at least one tuner, a storage medium 14, a controller 16 and a user interface 18. While the following description is provided with reference to an audio device, it is readily understood that at least some of the aspects of the present invention are also applicable to video player devices or other types of multimedia player devices.

FIG. 1 illustrates an audio player device configured to receive either an analog or a digital broadcast signal. Thus, the audio broadcast signal may be received by either a digital audio tuner 22 or an analog audio tuner 24. In the case of an analog broadcast signal, an analog-to-digital converter 26 may be inserted into the audio stream in order to convert the audio data into a digital format for storage on the storage medium 14. In the case of the digital broad signal, the digital data may be provided directly to the storage medium 14. Although decompression of the digital data can be performed prior to storage, it is envisioned that decompression would be deferred in order to maximize storage capacity. Likewise, analog sources may also be compressed for storage.

In either case, a storage medium 14 is provided for recording the audio data. The storage medium 14 must have sufficient processing speed to allow the playback operation to be performed simultaneously as the record operation as well as be sufficiently large enough to store a reasonable amount of audio data. Exemplary embodiments of the storage medium 14 may include a solid state memory card or an internal hard drive. However, one skilled in the art will readily recognize that the storage medium 14 may be implemented using a variety of commercially available products. It is further envisioned that the storage medium may be removable, such that it can be swapped in and out of other player devices (e.g., a portable MP3 player).

Figure 2:
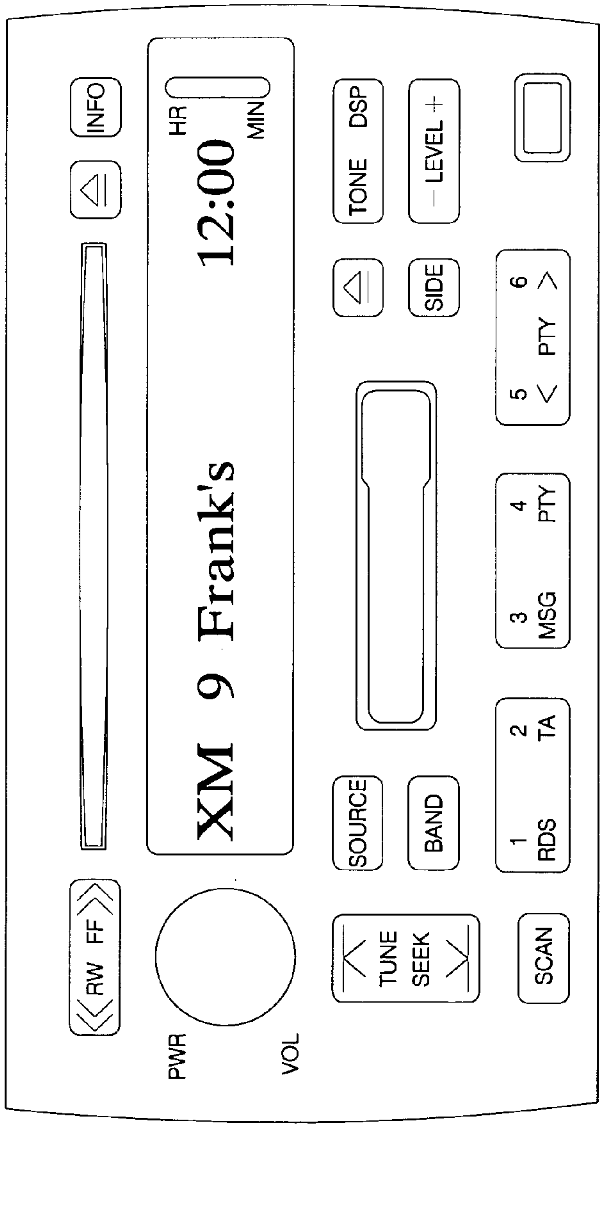
FIG. 2 is a diagram of an exemplary user interface for the audio player device in accordance with the present invention.

A controller 16 is interconnected between the storage medium 14 and the user interface 18. In this way, the controller 16 provides the overall control of the recording and playback functions as well as receives input from the user. As is well known in the art, the controller 16 may also be connected to one of the tuners or other audio components in order to control conventional playback feature (e.g., changing the channel). In addition to conventional radio features, the controller 16 implements various enhanced playback features as will be further described below. It is envisioned that each of the enhanced playback features is supported by the user interface 18 of the player device. An exemplary user interface for a standard automotive radio is shown in FIG. 2

In order to playback the stored audio data, a digital audio decoder 28 is used to decode the compressed audio data stored on the storage medium 14. As will be apparent to one skilled in the art, the decoder 28 supports the formats utilized by the analog and digital tuners. Additionally, a digital-to-analog converter 30 and/or an amplifier 32 may also be inserted into the audio stream before the audio data is output through a conventional audio speaker 34.

Figure 3:
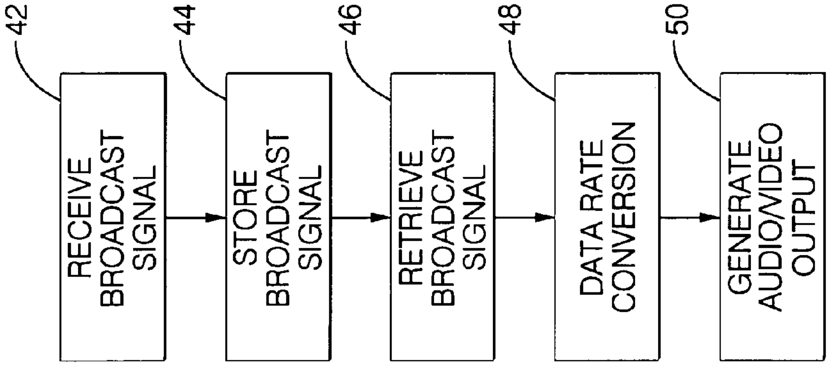
FIG. 3 is a flowchart depicting a method for enhancing the playback of an audio broadcast signal in real-time in accordance with the present invention.

In accordance with the present invention, a method for enhancing the playback of an audio broadcast signal in real-time 40 by using the above-described player device is shown in FIG. 3. Initially, the broadcast data signal is received 42 by the player device. Once the broadcast data signal is received, it may be stored on the storage medium 44 associated with the player device. Substantially simultaneous to the storage operation, the player device may also retrieve the broadcast data signal 46 and generate an audible output 50 that correlates to the broadcast data signal.

In order to manipulate the output from the player device, the retrieved broadcast data signal may undergo a data rate conversion 48 prior to the generation of the audio output. In other words, by reading the data from the storage medium at a rate which is different (faster or slower) than it is being written to the storage medium a time delay is created between the storage of the broadcast data and the generation of the audio output. The playback of the broadcast may then be enhanced by adjusting this time delay between the storage of the broadcast data and the generation of the audio output from the player device. As will be more fully described below, this method may be used to implement a variety of playback features.

Figure 4:
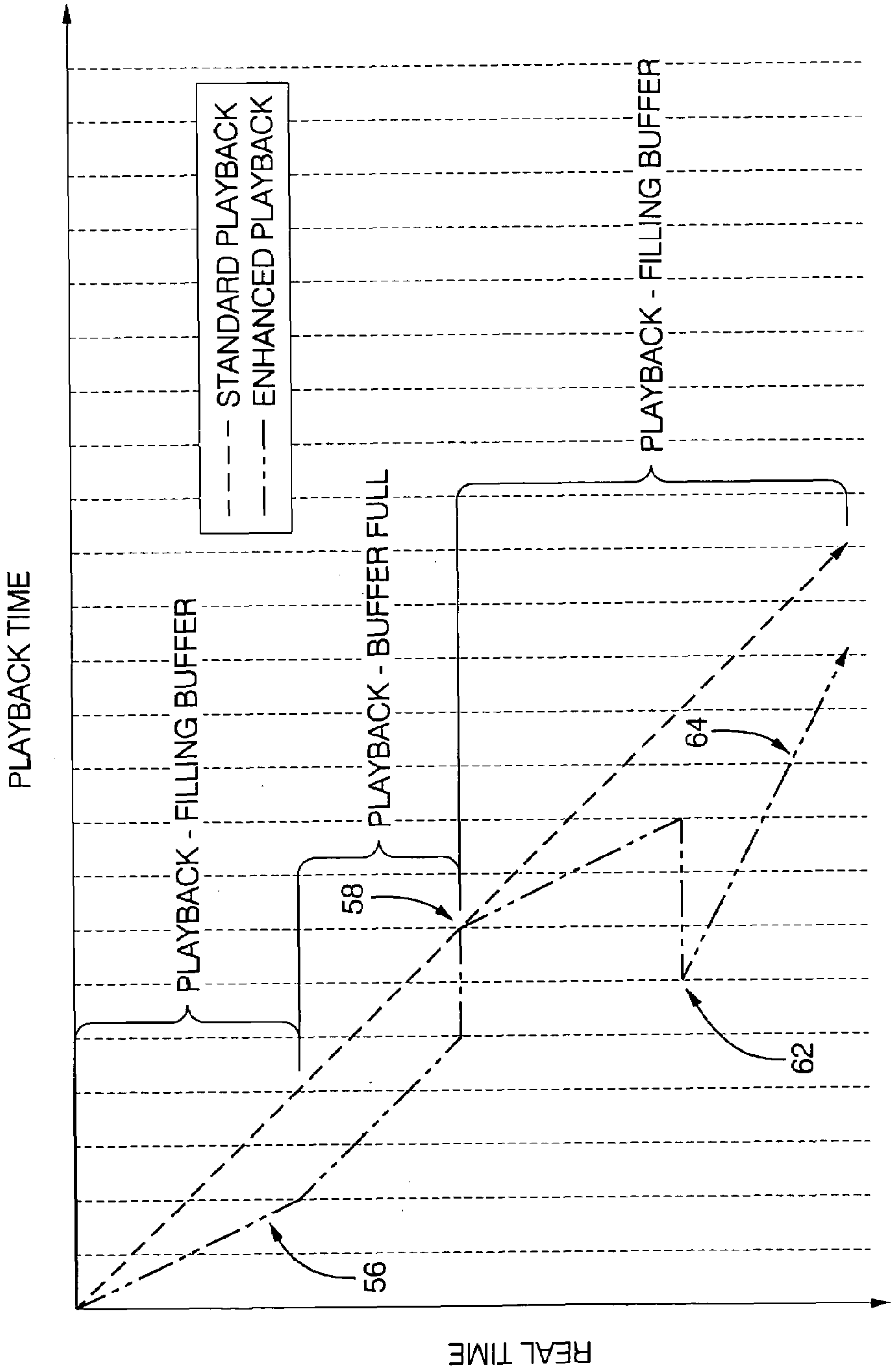
FIG. 4 is a diagram illustrating the enhanced broadcast features of the present invention.

FIG. 4 depicts some exemplary playback features that may be implemented in accordance with the present invention. For illustration purposes, the storing of the broadcast data shown at 52 is charted against the audio output from the player device shown at 54. Initially, a time lag is created between the storage of the broadcast data and the generation of the audio output (as shown at 56). Once the time lag has been created, the fast forward button may be enabled on the user interface. To do so, the time lag is reduced between the storage of the broadcast data and the generation of the audio output as shown at 58. Thus, the fast forward feature enables the user to skip over a segment of the broadcast data, whereby that segment is not output by the player device. It is also envisioned that the duration of the skipped segments (e.g., 15 or 30 second increments) may coincide to the duration of a typical commercial segment in the broadcast data.

During the course of any radio broadcast, the broadcast signal will include one or more "dead air" pauses in typical program content. In a preferred embodiment of the present invention, the time lag is created by subtly increasing these pauses in the audio output generated by the player device. In this way, the introduction of a time lag will not be apparent to the listener. More specifically, the pauses or non-audible portions of the broadcast signal are detected by monitoring the amplitude of the incoming signal. A non-audible portion of the broadcast signal may be assumed when the signal amplitude falls below an empirically derived threshold. The duration of the non-audible portions of the broadcast signal is slightly increased before being converted into audible output by the player device, thereby introducing a time lag. One skilled in the art will readily recognize that other known signal processing techniques may be used to identify the non-audible portion of the broadcast signal. In order to re-enable the fast forward feature, the time lag may be subsequently re-introduced into the audio stream. It is further envisioned that the time lag may be of sufficient size to support skipping over two or more segments of the broadcast data without having to re-establish the time lag between the storage of the broadcast data and the generation of the audio output.

In an alternative preferred embodiment, a time lag is created by retrieving the broadcast signal from the storage medium at a different rate than it is being read into the storage medium. As will be apparent to one skilled in the art, the data rate conversion is such that any variation in the generated output is imperceivable to the user. For an audio signal, reading the data at a different continuous rate causes a pitch shift in the audible output. However, if the rate difference is relatively small, then the pitch shift is also small and thus imperceivable to the listener. By adjusting the retrieval data rate, the time lag between the storage of the broadcast data and the corresponding audio output is controlled by the player device. Although the above-described techniques are presently preferred, it is envisioned that other techniques may be used to create and adjust a time lag between the storage of the broadcast data and the corresponding audio output generated by the player device.

Additionally, a replay feature may be implemented in accordance with the present invention. Upon depression of a rewind button, the audio output generated by the player device is discontinued. Referring to FIG. 4, generation of audio output is then continued at 62 using a portion of the broadcast signal stored on the player device. In other words, the player device replays a segment of the broadcast signal that has previously been heard by the listener. As will be apparent to one skilled in the art, the rewind button is not enabled until an adequate portion of the broadcast signal has been stored by the player device.

In an automotive application, it is presently preferred to maintain a close correlation in time between the incoming broadcast signal and the audio output generated by the audio system. To do so, the playback of the broadcast may be slightly faster following a replay operation. In order to increase the speed of the playback, the time delay between the storage of the broadcast data and the audio output generated by the player device is decreased as shown at 64. However, it should be noted that the playback resumes at normal speed once the time lag reaches some predetermined value. By maintaining at least some buffer (e.g., 30-60 seconds) between the storage of the broadcast data and the audio output generated by the player device, the present invention simultaneously enables the fast forward feature and the replay feature.

More specifically, the speed of the playback is increased by subtly decreasing the non-audible portions of the broadcast data signal. Again, the non-audible portions of the broadcast data are identified by monitoring the amplitude of the incoming signal. The duration of the non-audible portions of the broadcast signal are then slightly decreased before being converted into audible output by the player device, thereby reducing the time lag. As will be apparent to one skilled in the art, other techniques may be used to decrease the time lag between the storage of the broadcast data and the corresponding audio output generated by the player device.

It is further envisioned that a pause feature may be implemented in a manner similar to the replay feature. In order to resume generating audio output, the player device uses a portion of the broadcast signal stored on the player device. However, unlike the replay feature, the player device resumes the audio output at the same point in the stored broadcast data.

Following the pause operation, the playback of the broadcast may again be slightly faster as previously described in relation to the replay operation.

In addition to the above-described enhanced playback features, the player device may provide other recording features. It is envisioned that the player device may allow the user to request that certain broadcast programs be recorded on the storage medium. Depending on the capabilities of the tuner (s), a program may be recorded while the audio output for a second program is being broadcast by the player device. In the automotive environment, the player device may be configured to record such programs when the vehicle is turned off and/or when the user is not in the vehicle. Lastly, it is envisioned that the player device may allow the user to delete previously recorded programs.

While the above description constitutes the preferred embodiment of the invention, it will be appreciated that the invention is susceptible to modification, variation, and change without departing from the proper scope or fair meaning of the accompanying claims.

What is claimed is:

1. A method for enhancing in real-time the playback of a broadcast signal, comprising the steps of:

receiving a broadcast data signal at a player device, said data signal including an audible portion and at least one non-audible portion;

storing the broadcast data signal on the player device;

generating an output signal based on the broadcast data signal substantially simultaneous to the storage of the broadcast data signal; and identifying the non-audible portion of the broadcast signal and increasing the duration of the non-audible portion prior to generating the output signal, thereby creating a time delay between the storage of the broadcast signal and the generation of the output signal.

2. The method of claim 1 further comprising the step of adjusting the time delay between the storage of the broadcast data signal and the generation of the output signal, thereby manipulating the output signal from the player device.

3. The method of claim 2 wherein the step of adjusting the time delay further comprises maintaining the storage of the broadcast data signal within a predefined limit of the output signal that correlates to the broadcast data signal.

4. The method of claim 2 wherein the step of adjusting the time delay further comprises synchronizing the storage of the broadcast data signal with the generation of the output signal, such that a portion of the broadcast data signal is not output by the player device.

5. The method of claim 1 further comprising the step of subsequently reducing the time delay between the storage of the broadcast data signal and the generation of the output signal, thereby fast forwarding through a portion of the broadcast data signal.

6. The method of claim 1 wherein the step of creating a time delay further comprises:

discontinuing the generation of the output signal; and replaying a portion of the broadcast data signal stored on the player device.

7. The method of claim 1 wherein the step of creating a time delay further comprises the steps of:

pausing the generation of the output signal; and subsequently resuming generation of the output signal using a portion of the broadcast data signal stored on the player device.

8. The method of claim 1 further comprising the step of decreasing the duration of the non-audible portion of the broadcast data signal prior to generating the output signal, thereby reducing the time delay between the storage of the broadcast signal and the generation of the output signal.

9. A player device for enhancing in real-time the playback of an audio broadcast, comprising:

a tuner for receiving a broadcast data signal, said data signal including an audible portion and at least one non-audible portion;

a storage medium for storing the broadcast data signal;

a speaker for generating audio output that correlates to the broadcast data signal; and a controller connected with the tuner, the storage medium and the speaker, said controller operative to identify the non-audible portion of the broadcast signal and to increase the duration of the non-audible portion prior to generating the output signal, thereby creating a time delay between storing the broadcast data signal and generating the audio output; said controller also operative to adjust the time delay, thereby enhancing the playback of the broadcast data signal.

* * * * *